US011407962B2

(12) United States Patent
Moriya et al.

(10) Patent No.: US 11,407,962 B2
(45) Date of Patent: Aug. 9, 2022

(54) ARYL SUBSTITUTED ORGANOPOLYSILOXANE ANTIFOAMING AGENT AND METHOD FOR MANUFACTURING SAID ANTIFOAMING AGENT

(71) Applicant: SHIN-ETSU CHEMICAL CO., LTD., Tokyo (JP)

(72) Inventors: Hiroyuki Moriya, Annaka (JP); Shinji Irifune, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 310 days.

(21) Appl. No.: 16/762,955

(22) PCT Filed: Oct. 3, 2018

(86) PCT No.: PCT/JP2018/036961
§ 371 (c)(1),
(2) Date: May 11, 2020

(87) PCT Pub. No.: WO2019/093024
PCT Pub. Date: May 16, 2019

(65) Prior Publication Data

US 2020/0392428 A1 Dec. 17, 2020

(30) Foreign Application Priority Data

Nov. 10, 2017 (JP) ............................ JP2017-216902

(51) Int. Cl.

| | |
|---|---|
| ***C11D 9/36*** | (2006.01) |
| ***C11D 3/00*** | (2006.01) |
| ***B01D 19/04*** | (2006.01) |
| ***C11D 3/37*** | (2006.01) |
| ***C11D 17/00*** | (2006.01) |

(52) U.S. Cl.
CPC ........ *C11D 3/0026* (2013.01); *B01D 19/0409* (2013.01); *C11D 3/373* (2013.01); *C11D 17/0017* (2013.01)

(58) Field of Classification Search
CPC ....... C11D 3/0026; C11D 3/124; C11D 3/162; C11D 3/373; C11D 11/0017
See application file for complete search history.

(56) References Cited

U.S. PATENT DOCUMENTS

| | | | | |
|---|---|---|---|---|
| 5,082,590 | A | 1/1992 | Araud | |
| 6,512,015 | B1 | 1/2003 | Elms et al. | |
| 6,521,586 | B1 | 2/2003 | Hoogland et al. | |
| 6,521,587 | B1 | 2/2003 | L'Hostis et al. | |
| 9,845,445 | B2* | 12/2017 | Li | C11D 3/373 |
| 2005/0239908 | A1 | 10/2005 | Creutz et al. | |
| 2011/0188213 | A1 | 8/2011 | Domae et al. | |
| 2011/0294714 | A1* | 12/2011 | Delbrassinne | C11D 3/373 510/343 |
| 2015/0141561 | A1* | 5/2015 | Kennoki | C08L 83/04 524/588 |
| 2017/0209813 | A1* | 7/2017 | Kobayashi | B01D 19/04 |

(Continued)

FOREIGN PATENT DOCUMENTS

| | | | |
|---|---|---|---|
| JP | H01-171610 | A | 7/1989 |
| JP | 2001-087602 | A | 4/2001 |
| JP | 2001-120905 | A | 5/2001 |

(Continued)

OTHER PUBLICATIONS

Jul. 14, 2021 Extended European Search Report issued in European Patent Application No. 18875392.5.

(Continued)

*Primary Examiner* — Charles I Boyer
(74) *Attorney, Agent, or Firm* — Oliff PLC

(57) ABSTRACT

An antifoaming agent including: (A) an organopolysiloxane having a hydrolysable group shown by the formula (1) on at least one silicon atom of an organopolysiloxane segment constituting a main chain and containing siloxy units shown by the formula (2) at an amount of at least 10 mol % of the total, (B) a non-linear organosilicon resin other than the organopolysiloxane of component (A); and (C) a hydrophobic filler, and a method for manufacturing thereof.

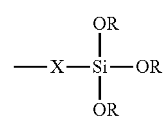

(1)

(where X represents a divalent hydrocarbon group having 1 to 10 carbon atoms; and R each independently represents a hydrogen atom or a monovalent hydrocarbon group having 1 to 4 carbon atoms)

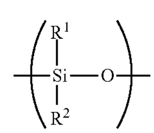

(2)

(where $R^1$ represents a monovalent hydrocarbon group having 1 to 12 carbon atoms; and $R^2$ represents an organic group having an aryl group and 6 to 12 carbon atoms, optionally containing an oxygen atom or a halogen atom)

16 Claims, No Drawings

(56) References Cited

U.S. PATENT DOCUMENTS

2018/0245020 A1* 8/2018 Colson .................. C09K 23/54

FOREIGN PATENT DOCUMENTS

| | | | |
|---|---|---|---|
| JP | 2002-113304 | A | 4/2002 |
| JP | 4680595 | B2 | 5/2011 |
| JP | 2012-516775 | A | 7/2012 |
| JP | 2016-052621 | A | 4/2016 |
| WO | 2004/018074 | A1 | 3/2004 |

OTHER PUBLICATIONS

Dec. 25, 2018 International Search Report issued in International Patent Application No. PCT/JP2018/036961.

May 12, 2020 International Preliminary Report on Patentability issued in International Patent Application No. PCT/JP2018/036961.

* cited by examiner

ARYL SUBSTITUTED ORGANOPOLYSILOXANE ANTIFOAMING AGENT AND METHOD FOR MANUFACTURING SAID ANTIFOAMING AGENT

TECHNICAL FIELD

The present invention relates to an antifoaming agent, in particular, foam-suppressing technology for a detergent.

BACKGROUND ART

As an antifoaming agent for suppressing foam generated in washing, a silicone antifoaming agent is known. Until now, in detergents containing surfactants excellent in cleaning performance, there have often been a problem of foaming, and various suggestions have been made against this problem. For example, a fluid antifoaming agent composition containing an MQ resin and no inorganic filler (Patent Document 1), foam control agents in which an organopolysiloxane substance having an aromatic substituent is used in the presence of an organosilicon resin (Patent Documents 2 to 4), and a silicone foam control composition containing a silicone antifoaming agent, mineral oil, polydiorganosiloxane which contains a polyoxyalkylene group, and a finely ground or pulverized filler (Patent Document 5), and the like are suggested.

However, these do not satisfy initial antifoaming properties, further lack physical and chemical stability, and these problems have been desired to be solved.

CITATION LIST

Patent Literature

Patent Document 1: Japanese Unexamined Patent Application Publication No. H1-171610

Patent Document 2: Japanese Unexamined Patent Application Publication No. 2001-120905

Patent Document 3: International Publication No. 2004/018074 (Japanese Patent No. 4680595)

Patent Document 4: Japanese Unexamined Patent Application Publication No. 2001-087602

Patent Document 5: Japanese Unexamined Patent Application Publication No. 2002-113304

SUMMARY OF INVENTION

Technical Problem

An object of the present invention is to provide an antifoaming agent which has excellent foam control properties in washing (i.e., from washing to rinsing), is safe and inert to components in a detergent composition, and is more stable in various detergents; and a method for manufacturing thereof.

Solution to Problem

To solve the above problem, the present inventors have earnestly studied and found out that an antifoaming agent formed containing the following components (A) to (C) exhibits an excellent foam-suppressing effect in washing and is safe and is also excellent in storage stability in a detergent composition, thereby completing the present invention.

Accordingly, an object of the present invention is to provide the following antifoaming agent and a method for manufacturing thereof.

The present invention provides an antifoaming agent comprising:

(A) an organopolysiloxane having a hydrolysable group shown by the formula (1) on at least one silicon atom of an organopolysiloxane segment constituting a main chain and containing siloxy units shown by the formula (2) at an amount of at least 10 mol % of the total, (1)

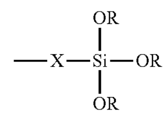

wherein X represents a divalent hydrocarbon group having 1 to 10 carbon atoms; and R each independently represents a hydrogen atom or a monovalent hydrocarbon group having 1 to 4 carbon atoms, (2)

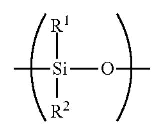

wherein $R^1$ represents a monovalent hydrocarbon group having 1 to 12 carbon atoms; and $R^2$ represents an organic group having an aryl group and 6 to 12 carbon atoms, optionally containing an oxygen atom or a halogen atom;

(B) a non-linear organosilicon resin other than the organopolysiloxane of component (A); and (C) a hydrophobic filler.

Such an inventive antifoaming agent exhibits an excellent foam-suppressing effect in washing and is safe and is also excellent in storage stability in a detergent composition.

Furthermore, in this case, the component (A) is preferably an organopolysiloxane shown by the following general formula (3) having a kinematic viscosity of 200 to 50,000 $mm^2/s$ at 25° C., (3)

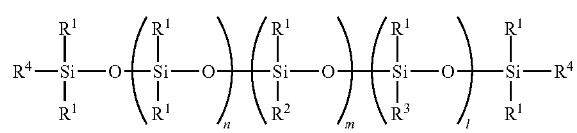

wherein $R^1$ and $R^2$ are as described above; $R^3$ represents the hydrolysable group shown by the formula (1); $R^4$ is the same as $R^1$, or a group selected from the hydrolysable group of formula (1), a hydroxy group and a methoxy group; "n" represents an integer of 5 to 10,000; "m" represents an integer of 1 to 2,000; and "1" represents an integer of 1 to 20.

When the component (A) is the above organopolysiloxane, the antifoaming agent exhibits an excellent foam-suppressing effect in washing and is safe and is also excellent in storage stability in a detergent composition with more certainty, which is preferable.

Furthermore, in this case, the component (B) is preferably a siloxane resin comprising: an $R^5{}_3SiO_{112}$ unit, wherein $R^5$ represents a monovalent hydrocarbon group, a hydrocarbonoxy group, or a hydroxy group, and 10 mol % or more of $R^5$ is a monovalent hydrocarbon group; and an $SiO_2$ unit, wherein $R^5{}_3SiO_{1/2}$ unit/$SiO_2$ unit=0.4 to 2.5.

Such a component (B) is preferable in view of workability and compatibility with other materials, and the obtained antifoaming agent is preferable because it can exhibit sufficient antifoaming properties.

Furthermore, in this case, a content of the component (A) is preferably 30 to 90 mass %, a content of the component (B) is preferably 1 to 50 mass %, and a content of the component (C) is preferably 0.5 to 50 mass %.

Such an antifoaming agent can be an antifoaming agent which exhibits an excellent foam-suppressing effect and is safe and is also excellent in storage stability in a detergent composition with more certainty.

Furthermore, in this case, the antifoaming agent preferably comprises 0.5 to 20 mass % of (D) an organic oil.

Such an antifoaming agent has a further improved antifoaming stability and is preferable in view of compatibility and storage stability.

Furthermore, the present invention provides a method for manufacturing an antifoaming agent, comprising a step of performing a heat treatment at a temperature of 50° C. or higher and 200° C. or lower after mixing the components (A) to (C) in the antifoaming agent.

Furthermore, in this case, the method preferably further comprises a step of adding an alkaline substance and mixing before performing the heat treatment.

By performing such a heat treatment and an alkali treatment, antifoaming properties (persistence) is further improved.

Furthermore, in this case, the method preferably further comprises a step of mixing (D) an organic oil with the components (A) to (C).

By thus mixing (D) an organic oil, antifoaming stability is further improved, which is preferable.

Advantageous Effects of Invention

Surprisingly, the inventive antifoaming agent is stable in various liquid detergents and has excellent foam control properties in washing, and is thereby useful as a silicone antifoaming agent used for a detergent composition, in particular, a liquid detergent composition. That is, the alkoxy (hydroxy)silyl group present in the structure of component (A) is subjected to a hydrolysis reaction with moisture contained in the detergent and/or moisture contained in the hydrophobic filler to promote intermolecular crosslinking of the component (A) and surface treatment of the component (B) or the component (C) with the component (A). Thus, this brings the above effects.

DESCRIPTION OF EMBODIMENTS

Hereinafter, the present invention will be described in detail.

The inventive antifoaming agent includes:

(A) an organopolysiloxane having a hydrolysable group shown by the following formula (1) on at least one silicon atom of an organopolysiloxane segment constituting a main chain and containing siloxy units shown by the following formula (2) at an amount of at least 10 mol % of the total, (B) a non-linear organosilicon resin other than the organopolysiloxane of component (A); and (C) a hydrophobic filler.

[Component (A)]

Component (A) is an organopolysiloxane having a hydrolysable group shown by the formula (1) on at least one silicon atom of an organopolysiloxane segment constituting a main chain and containing siloxy units shown by the formula (2) at an amount of at least 10 mol % of the total, and is preferably shown by the following general formula (3).

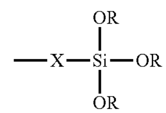

(1)

(where X represents a divalent hydrocarbon group having 1 to 10 carbon atoms; and R each independently represents a hydrogen atom or a monovalent hydrocarbon group having 1 to 4 carbon atoms.)

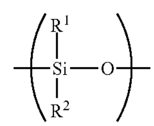

(2)

(where $R^1$ represents a monovalent hydrocarbon group having 1 to 12 carbon atoms; and $R^2$ represents an organic group having an aryl group and 6 to 12 carbon atoms, optionally containing an oxygen atom or a halogen atom.)

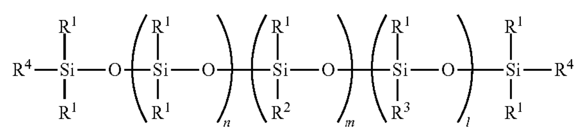

(3)

In the formula (3), $R^1$ each independently represents a monovalent hydrocarbon group having 1 to 12 carbon atoms including an alkyl group, an aryl group, an aralkyl group, and an alkenyl group; preferably a methyl group, an ethyl group, a propyl group, a butyl group, a pentyl group, a hexyl group, a heptyl group, an octyl group, a nonyl group, a decyl group, an undecyl group, a dodecyl group, and a phenyl group; more preferably a methyl group, an ethyl group, a hexyl group, and an octyl group; furthermore preferably a methyl group and an ethyl group.

$R^2$ represents an organic group having an aryl group and 6 to 12 carbon atoms, optionally containing an oxygen atom or a halogen atom in some cases, preferably a phenyl group, a 2-phenylpropyl group, an eugenol group, a phenylpropyl group, a propyl phenyl ether group, a propylphenol group, a 2-chlorostylyl group, a 4-chlorostylyl group, a 4-methylstylyl group, a 3-methylstylyl group, a 4-t-butylstylyl group, a 2,4- or 2,5-dimethylstylyl group; more preferably a 2-phenylpropyl group. Incidentally, the 2-phenylpropyl group is a group derived from an α-methylstyrene.

$R^3$ represents a hydrolysable group shown by the formula (1). In the formula (1), X represents a divalent hydrocarbon group such as an alkylene group having 1 to 10 carbon atoms, preferably a methylene group, an ethylene group, a propylene group, a butylene group, and the like; more preferably an ethylene group.

In the formula (1), R each independently represents a hydrogen atom or a monovalent hydrocarbon group such as an alkyl group having 1 to 4 carbon atoms; preferably a hydrogen atom, a methyl group, an ethyl group, or a propyl group; more preferably a hydrogen atom, a methyl group, or an ethyl group.

$R^4$ is each independently the same as $R^1$ or a group selected from the hydrolysable group shown by the formula (1), a hydroxy group, and a methoxy group; preferably a methyl group.

In the general formula (3), "n" represents an integer of 5 to 10,000, preferably 10 to 1,000; "m" represents an integer of 1 to 2,000, preferably 10 to 200; and "1" represents an integer of 1 to 20, preferably 1 to 10, more preferably 1 to 5. Note that the siloxy units shown by the formula (2) are contained at an amount of at least 10 mol % of the total siloxane, preferably 10 to 40 mol %. If the siloxy units shown by the formula (2) are less than 10 mol % of the total, sufficient antifoaming properties cannot be obtained. Such a component (A) is preferably contained at an amount of 30 to 90 mass % of the total antifoaming agent, more preferably contained at an amount of 50 to 80 mass %. The content of 30 mass or more and 90 mass % or less is preferable since storage stability and antifoaming properties can be obtained with more certainty.

The component (A) preferably has a kinematic viscosity in the range of 200 to 50,000 $mm^2/s$, in particular, 800 to 20,000 $mm^2/s$ at 25° C. measured with a Cannon-Fenske viscometer.

The component (A) can be used alone or in combination of two or more kinds.

A known method can be used as a method for manufacturing the component (A), which can be obtained easily by adding α-methylstyrene, vinyltrimethoxysilane, or vinyltriethoxysilane having a terminal double bond, to hydrogenpolysiloxane in the presence of a platinum or rhodium catalyst. In some cases, the reaction can be performed in the presence of a solvent such as toluene. Reaction temperature is not particularly limited, but is preferably 60° C. or higher and 150° C. or lower. Reaction time is not particularly limited, but is preferably 0.5 to 10 hours, more preferably 1 to 5 hours.

[Component (B)]

The organosilicon resin of component (B) is a non-linear siloxane resin including the one shown by the average composition formula (4), for example.

$$R^5_aSiO_{(4-a)/2} \quad (4)$$

(where $R^5$ each independently represents a monovalent hydrocarbon group (for example, a monovalent hydrocarbon group having 1 to 10 carbon atoms), a hydrocarbonoxy group, or a hydroxy group, and 10 mol % or more, in particular, 20 mol % or more of $R^5$ is a monovalent hydrocarbon group. "a" has an average of 0.5 to 2.4.)

In the above formula, $R^5$ preferably represents an alkyl group having 1 to 6 carbon atoms, a phenyl group, a hydroxy group, or an alkoxy group such as a methoxy group; most preferably, a methyl group, an ethyl group, or a phenyl group. In view of antifoaming properties and workability, at least 80 mol % of the total $R^5$ are preferably methyl groups.

The organosilicon resin of component (B) preferably contains a monovalent trihydrocarbonsiloxy group (an $R^5_3SiO_{1/2}$ unit (an M unit)) and a tetrafunctional group (an $SiO_2$ unit (a Q unit)). Specifically, the number ratio of M units to Q units (M/Q) is preferably in the range of 0.4 to 2.5, more preferably 0.4 to 1.1, most preferably 0.5 to 0.8 (which corresponds to a=1.0 to 1.33). When the number of Q units satisfies the lower limit of the above range or more, the organosilicon resin is free from excess increasing of the viscosity and the risk of lowering the workability and the compatibility with other materials, which is preferable. When the number of Q units satisfies the upper limit of the above range or less, the organopolysiloxane is free from excess decreasing of the molecular weight, and the obtained composition can exhibit sufficient antifoaming properties, which is preferable.

The component (B) is preferably solid at room temperature, but liquid MQ resin can be appropriately used. Furthermore, the component (B) most preferably consists exclusively of the M and Q units defined above, but a resin containing an M unit, a trivalent group (an $R^5SiO_{3/2}$ unit (a T unit)), and a Q unit can also be used instead. Note that in this case, the ratio of T unit is preferably 0 to 30 mass % of the component (B).

Such organosilicon resins are well known. They can be produced by hydrolysis of particular silane, for example, in the presence or absence of a solvent. Particularly preferable are hydrolysis and condensation of a precursor of a tetravalent siloxy unit (e.g., tetra-orthosilicate, tetraethyl orthosilicate, polyethyl silicate, or sodium silicate) and a precursor of a monovalent trialkylsiloxy unit (e.g., trimethylchlorosilane, trimethylethoxysilane, hexamethyldisiloxane, or hexamethyldisilazane) in the presence of a solvent such as xylene. The resulting MQ resin can if desired be further trimethylsilylated to react out residual Si—OH groups, or can be heated in the presence of a base to cause self-condensation of the resin by elimination of the Si—OH groups.

The organosilicon resin (B) preferably exists at an amount of 1 to 50 mass %, in particular 2 to 30 mass %, and most preferably 4 to 15 mass % of the total antifoaming agent. When the content is 1 mass % or more, sufficient antifoaming properties can be obtained with certainty, and when 50 mass % or less, there is no risk of degrading workability, which is preferable.

[Component (C)]

The hydrophobic filler of component (C) is well known as material for foam control, and preferably has a specific surface area of 50 $m^2/g$ or more, more preferably 50 to 700 $m^2/g$, furthermore preferably 100 to 500 $m^2/g$ measured by BET method. The specific surface area of 50 $m^2/g$ or more gives preferable antifoaming properties, and the specific surface area of 700 $m^2/g$ or less eliminates the risk of excess increasing of the viscosity of the antifoaming agent, which is preferable. The hydrophobic filler may be used alone, or in combination of two or more kinds. Examples of the hydrophobic filler include silica, titanium dioxide, powdered quartz, aluminum oxide, aluminosilicate, organic wax (e.g., polyethylene wax and microcrystalline wax), zinc oxide, magnesium oxide, salts of aliphatic carboxylic acids, reaction products of isocyanate and particular material (e.g., cyclohexylamine), and alkylamide (e.g., ethylenebisstearamide or methylenebisstearamide).

Some of the fillers mentioned above are not hydrophobic intrinsically, but can be used after being treated to hydrophobic. A preferable filler is silica, which may be treated with fatty acid, for example; but preferably treated using a methyl-substituted organosilicon substance. Suitable hydrophobizing agents include polydimethylsiloxane, dimethylsiloxane polymer with the terminal being blocked with silanol or a silicon-bonded alkoxy group, hexamethyldisilazane, and hexamethyldisiloxane.

Preferable silica includes those prepared by heating such as fumed silica or those prepared by precipitation, but other kinds of silica such as those formed by gel formation are allowable. The silica filler has an average particle size of 0.5 to 50 μm, for example, and preferably 2 to 30 μm, most preferably 5 to 25 μm.

Incidentally, this average particle size can be determined with a particle size distribution measuring device by a laser diffraction method and the like. The average particle size can be obtained as a mass-average value (or a median diameter) and the like. Such a substance is well known and is commercially available in both hydrophobic form and hydrophilic form.

The amount of (C) in the inventive antifoaming agent is preferably 0.5 to 50 mass %, in particular 1 to 15 mass %, most preferably 2 to 8 mass % of the total antifoaming agent. The content of 0.5 mass % or more is preferable in view of antifoaming properties; and the content of 50 mass % or less is preferable to eliminate the risk of degrading handling properties.

[Component (D)]

The inventive antifoaming agent preferably further contains (D) an organic oil. Antifoaming stability is further improved when such an organic oil is contained. The component (D) may be used alone, or in combination of two or more kinds. The component (D) is typically insoluble to water and preferably contains less than 10 mass % of aromatic groups. The component (D) has to be liquid at the operating temperature of the antifoaming agent, which may be as high as 10 to 95° C. For many uses, the organic oil is preferably liquid at 25° C.

Preferable organic oil includes a mineral oil (in particular, a hydrogenated mineral oil or a white oil), liquid polyisobutene, isoparaffin oil, and a vegetable oil (e.g., a peanut oil, a coconut oil, an olive oil, a cottonseed oil, and a linseed oil), for example. Specific examples thereof include polyalkylene glycols such as polypropylene glycol, polybutylene glycol, copolymer and blocked copolymer of polyethylene and polypropylene glycol; ester oils such as diisobutyl adipate, di 2-hexyldecyl adipate, di-2-heptylundecyl adipate, N-alkylglycol monoisostearate, isocetyl isostearate, trimethylolpropane triisostearate, ethylene glycol di-2-ethylhexanoate, neopentyl glycol di-2-ethylhexanoate, cetyl 2-ethylhexanoate, trimethylolpropane tri-2-ethylhexanoate, pentaerythritol tetra-2-ethylhexanoate, cetyl octanoate, octyl dodecyl gum ester, oleyl oleate, octyldodecyl oleate, decyl oleate, neopentyl glycol dicaprate, triethyl citrate, di 2-ethylhexyl succinate, amyl acetate, ethyl acetate, butyl acetate, isocetyl stearate, butyl stearate, 2-ethylhexyl stearate, diisopropyl sebacate, di-2-ethylhexyl sebacate, cetyl lactate, myristyl lactate, isopropyl palmitate, 2-ethylhexyl palmitate, 2-hexyldecyl palmitate, 2-heptylundecyl palmitate, cholesteryl 12-hydroxystearate, dipentaerythritol fatty acid ester, isononyl isononanate, triisohexanoin, isopropyl myristate, 2-octyldodecyl myristate, 2-hexyldecyl myristate, myristyl myristate, hexyldecyl dimethyloctanoate, ethyl laurate, hexyl laurate, di 2-octyldodecyl N-lauroyl-L-glutamate ester, diisostearyl malate, dextrin palmitate ester, dextrin stearate ester, dextrin 2-ethylhexanoate palmitate ester, sucrose palmitate ester, sucrose stearate ester, monobenzylidene sorbitol, dibenzylidene sorbitol; and ester of carboxylic acid and monovalent alcohol such as decanol, for example, dioctyl phthalate, diethyl succinate, methyl caprylate, butyl pelargonate, ethyl stearate, dodecyl laurate or methyl melissate. Examples of organic fluids which are not liquid at 25° C. but are liquid at higher temperatures include vaseline, higher alcohols, and higher carboxylic acids such as myristic acid.

The component (D) may be used alone, or in combination of two or more kinds. The amount of (D) in the inventive antifoaming agent is preferably 0.5 to 20 mass %, in particular 1 to 15 mass %, most preferably 2 to 10 mass % based on the total mass of the antifoaming agent. The content in the above range is preferable in view of compatibility and storage stability.

The inventive antifoaming agent may be manufactured by any previous method, and the method preferably contains a process of performing a heat treatment at a temperature of 50 to 200° C., more preferably 60 to 180° C. The heat temperature of 50° C. or more eliminates the risk of insufficient reaction, and the heat temperature of 200° C. or less eliminates the risk of decomposition of the siloxane bond, which is preferable. The reaction time is preferably 0.5 to 10 hours, more preferably 1 to 5 hours. Performing the heat treatment promotes intermolecular crosslinking of the component (A), together with surface treatment of the component (B) and the component (C) with the component (A) to further improve the antifoaming properties (persistence). Furthermore, these antifoaming agents can be provided by mixing under shearing. Incidentally, the shearing means all the stirring including the use of an ordinary stirring blade, and the preferable sheared state is a state in which the hydrophobic filler of component (C) is dispersed into the antifoaming agent.

The inventive method for manufacturing an antifoaming agent preferably contains an alkali treatment step in any stage of mixing the antifoaming agent component, preferably in a stage before the heat treatment. Examples of the alkaline substance include basic compounds that contain alkaline metal or alkaline earth metal, preferably potassium hydroxide, sodium hydroxide, potassium siliconate, sodium siliconate, sodium bicarbonate, potassium carbonate, and sodium carbonate. The temperature of the alkali treatment is preferably 50 to 200° C., more preferably 80 to 150° C. The reaction time is preferably 0.5 to 10 hours, more preferably 1 to 5 hours. Performing the alkali treatment promotes intermolecular crosslinking of the component (A), together with surface treatment of the component (B) and the component (C) with the component (A) to further improve the antifoaming properties (persistence). Incidentally, the addition amount of the alkaline substance is preferably 0.01 to 10 mass %, more preferably 0.1 to 5 mass % based on the antifoaming agent.

The inventive antifoaming agent can be contained in a detergent. The detergent further contains at least one surfactant and water in addition to the antifoaming agent. The detergent is based on a formulation that contains the surfactant and water. The surfactant helps to wet the surface of fiber, to loosen dirt, and to stabilize dirt particles and oil droplets. The surfactant is typically an anionic surfactant. Specifically alkylbenzene sulfonate may be present at 5 to 30 mass % of the total detergent composition; or a nonionic surfactant such as 7-EO ethoxylate may be present at 5 to 40 mass % of the total detergent composition.

The detergent may further contain the following components in accordance with needs: hydrotropes (e.g., salts of short chain benzene sulfonates such as xylene-, cumene-, and toluene-sulfonate); builders to suppress hardness of water and to disperse dirt and soil particles in cleaning water (examples including sodium citrate, sodium salt of tartarate as well as mono- and di-succinate, STPP, silicate, carbonate, aluminosilicate, as well as zeolite); alcohols (whose content is 5 to 10 mass % of the total detergent composition, for example); enzymes and enzyme stabilizers (e.g., sodium formate and $CaCl_2$); cleaning auxiliaries (e.g., Borax and hydrogen peroxide); optical brighteners; perfumes; opacifiers; as well as a base to adjust the pH, (e.g., alkanolamine such as triethanolamine). Each of the contents of the detergent composition is based on the total mass of the detergent, with the balance being water. This typical formulation may be altered to a special liquid detergent for intended washing use such as wool products (in which the anionic surfactant will be replaced by a cationic surfactant), and color care formulation that contains dye-transfer inhibitor.

Note that the inventive antifoaming agent is useful as an antifoaming agent to be blended to a detergent and the like, and in this case, is preferably added to the detergent at an amount of less than 5 mass % based on the total mass of the detergent composition and antifoaming agent to be combined. The amount of the antifoaming agent to be added to the detergent is preferably 0.01 to 0.8 mass %, more preferably 0.03 to 0.25 mass % based on the total mass. The detergent is preferably a liquid detergent. The antifoaming agent is typically added to a liquid that has a potential to foam such as a detergent, prior to use. The antifoaming agent is added to a detergent, and the liquid is stirred to disperse the antifoaming agent into the detergent.

EXAMPLE

Hereinafter the present invention will be described specifically with reference to Preparation Examples, Comparative Preparation Examples, Examples, and Comparative Examples, but the present invention is not limited to the following Examples. Note that the amount of each component in the Table is an amount in terms of the pure material unless otherwise noted. In addition, in the following examples, "parts" means parts by mass, and "%" means mass %.

Note that the MQ resin used in the following examples had a $(CH_3)_3SiO_{1/2}$ unit as the M unit and an $SiO_2$ unit as the Q unit.

Preparation Example 1

The following components were stirred with a homomixer at 1,000 rpm until the silica had dispersed sufficiently:

(A) organopolysiloxane (viscosity: 900 $mm^2/s$) having the following structure — 80 parts

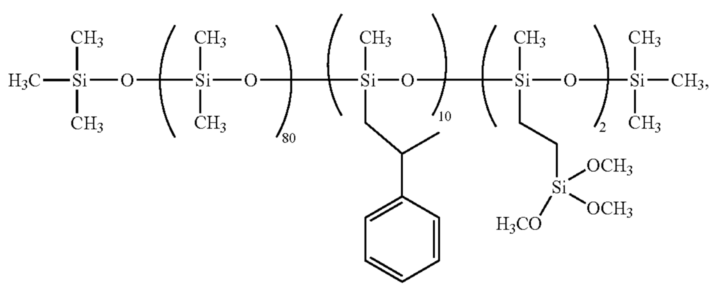

(B) MQ resin (M/Q = 0.6) — 8 parts, and (C) silica (Sipernat D10, Evonik Industries, specific surface area: 90 $m^2/g$, average particle size: 6.5 μm) — 12 parts, and an antifoaming agent was obtained.

Preparation Example 2

The following components were stirred with a homomixer at 2,000 rpm until the silica had dispersed sufficiently:

(A) organopolysiloxane (viscosity: 17,000 $mm^2/s$) having the following structure — 70 parts

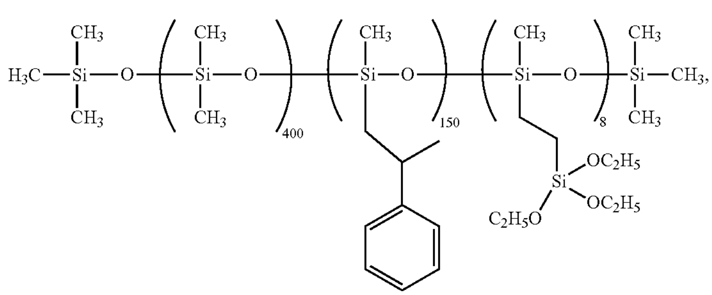

(B) MQ resin (M/Q = 0.75) — 5 parts, (C) silica (Sipernat D10, Evonik Industries) — 10 parts, and (D) ethyl laurate — 15 parts, and an antifoaming agent was obtained.

Preparation Example 3

The following components were stirred with a homomixer at 2,000 rpm until the silica had dispersed sufficiently:

| | |
|---|---|
| (A) organopolysiloxane (viscosity: 1,800 $mm^2/s$) having the following structure | 60 parts |

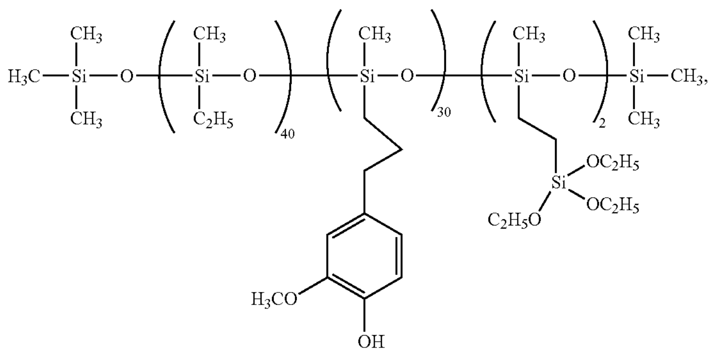

| | |
|---|---|
| (B) MQ resin (M/Q = 0.6) | 15 parts, |
| (C) silica (Sipernat D13, Evonik Industries; specific surface area, 110 $m^2/g$; average particle size, 10.5 μm) and | 15 parts, |
| (D) octyl stearate | 10 parts, |
| and an antifoaming agent was obtained. | |

Preparation Example 4

The antifoaming agent obtained in Preparation Example 1 was heated at 80° C. for 2 hours to obtain an antifoaming agent.

Preparation Example 5

0.1 parts of potassium hydroxide was added to the antifoaming agent obtained in Preparation Example 2, and this was heated at 140° C. for 3 hours to obtain an antifoaming agent.

Comparative Preparation Example 1

The following components were stirred with a homomixer at 1,000 rpm until the silica had dispersed sufficiently:

| | |
|---|---|
| (A) organopolysiloxane (viscosity: 900 $mm^2/s$) having the following structure | 80 parts |

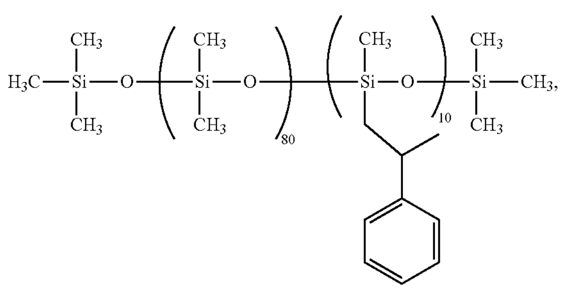

| | |
|---|---|
| (B) MQ resin (M/Q = 0.6) | 8 parts, |
| and | |
| (C) silica (Sipernat D10, Evonik Industries) | 12 parts, |
| and an antifoaming agent was obtained. | |

Comparative Preparation Example 2

The following components were stirred with a homomixer at 2,000 rpm until the silica had dispersed sufficiently:

| | |
|---|---|
| (A) organopolysiloxane (viscosity: 2,000 $mm^2/s$) having the following structure | 60 parts |

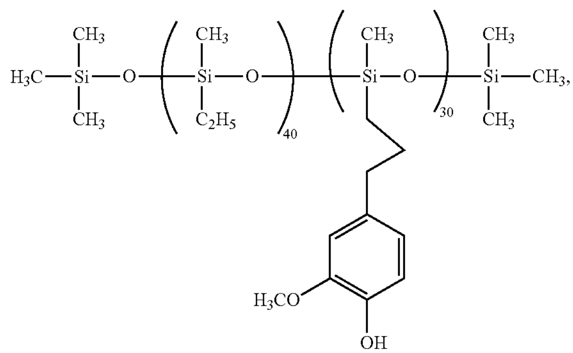

| | |
|---|---|
| (B) MQ resin (M/Q = 0.6) | 15 parts, |
| (C) silica (Sipernat D13, Evonik Industries) and | 15 parts, |
| (D) octyl stearate | 10 parts, |
| and an antifoaming agent was obtained. | |

Comparative Preparation Example 3

The antifoaming agent obtained in Comparative Preparation Example 1 was heated at 80° C. for 2 hours to obtain an antifoaming agent.

Examples 1 to 5 and Comparative Examples 1 to 5

Stability Test 0.5% or 1% of an antifoaming agent was added to the following Detergent composition A (*1), Detergent composition B (*2), and Detergent composition C (*3), and this was stirred with a homomixer at 2,000 rpm for 30 seconds to obtain a detergent composition containing an antifoaming agent.

(*1) Detergent composition A: 10% of sodium lauryl ether sulfate, 7% of sodium dodecylbenzenesulfonate, 5% of sodium tripolyphosphate, and 78% of water.

(*2) Detergent composition B: 10% of monoethanolamine lauryl ether sulfate, 15% of monoethanolamine dodecylbenzenesulfonate, 10% of sodium laurate, and 65% of water.

(*3) Detergent composition C: 10% of lauryl alcohol ethoxylate, 15% of sodium dodecylbenzenesulfonate, 0.5% of alkylamine oxide, and 74.5% of water.

Subsequently, the obtained detergent composition containing an antifoaming agent was introduced into a glass bottle and stored in a thermostatic oven at 40° C., and the change of appearance after 2 weeks was observed: no change: good, slight precipitation or separation: fair, apparent precipitation or separation: bad.

Evaluation Test of Antifoaming Properties 0.16 parts of the detergent composition containing an antifoaming agent obtained above, 40 parts of tap water with a hardness of 80, and 1 g of cotton cloth were introduced into a glass bottle. This was shaken with a vertical shaker (manufactured by YAYOI. CO., LTD) for 40 minutes. Then, the height of the foam was measured to determine the antifoaming properties (foam suppressing performance).

These results are shown in Table 1.

TABLE 1

| | | Examples | | | | | Comparative Examples | | | | |
|---|---|---|---|---|---|---|---|---|---|---|---|
| | Components (parts by mass) | 1 | 2 | 3 | 4 | 5 | 1 | 2 | 3 | 4 | 5 |
| 1 | Antifoaming agent of Preparation Example 1 | 0.5 | | | | | | | | | |
| 2 | Antifoaming agent of Preparation Example 2 | | 1.0 | | | | | | | | |
| 3 | Antifoaming agent of Preparation Example 3 | | | 0.5 | | | | | | | |
| 4 | Antifoaming agent of Preparation Example 4 | | | | 0.5 | | | | | | |
| 5 | Antifoaming agent of Preparation Example 5 | | | | | 1.0 | | | | | |
| 6 | Antifoamang agent of Comparative Preparation Example 1 | | | | | | 0.5 | | | 1.0 | |

TABLE 1-continued

| | | Examples | | | | | Comparative Examples | | | | |
|---|---|---|---|---|---|---|---|---|---|---|---|
| | Components (parts by mass) | 1 | 2 | 3 | 4 | 5 | 1 | 2 | 3 | 4 | 5 |
| 7 | Antifoamang agent of Comparative Preparation Example 2 | | | | | | | 0.5 | | | |
| 8 | Antifoamang agent of Comparative Preparation Example 3 | | | | | | | | 0.5 | | 1.0 |
| 9 | Detergent composition A | 99.5 | | | 99.5 | | 99.5 | | 99.5 | | |
| 10 | Detergent composition B | | 99.0 | | | 99.0 | | | | 99.0 | |
| 11 | Detergent composition C | | | 99.5 | | | | 99.5 | | | 99.0 |
| Evaluation | Stability of appearance (after 2 weeks) | fair | good | good | good | fair | fair | bad | fair | bad | bad |
| | Height of foam /mm (after 40 minutes) | 4.5 | 4.0 | 5.0 | 4.2 | 3.8 | 6.7 | 8.5 | 5.6 | 6.1 | 5.7 |

On the basis of the results of the stability test and the evaluation test of antifoaming properties in Examples 1 to 5 and Comparative Examples 1 to 5, it was confirmed that the detergent composition containing the inventive antifoaming agent formed a more stable detergent composition and was able to control foam more effectively.

The invention claimed is:

1. An antifoaming agent comprising:

(A) an organopolysiloxane having a hydrolysable group shown by the formula (1) on at least one silicon atom of an organopolysiloxane segment constituting a main chain and containing siloxy units shown by the formula (2) at an amount of at least 10 mol % of the total,

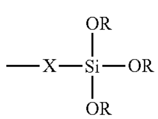
(1)

wherein X represents a divalent hydrocarbon group having 1 to 10 carbon atoms; and R each independently represents a hydrogen atom or a monovalent hydrocarbon group having 1 to 4 carbon atoms,

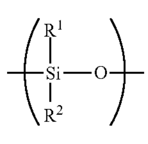
(2)

wherein $R^1$ represents a monovalent hydrocarbon group having 1 to 12 carbon atoms; and $R^2$ represents an organic group having an aryl group and 6 to 12 carbon atoms, optionally containing an oxygen atom or a halogen atom;

(B) a non-linear organosilicon resin other than the organopolysiloxane of component (A); and (C) a hydrophobic filler.

2. The antifoaming agent according to claim 1, wherein the component (A) is an organopolysiloxane shown by the following general formula (3) having a kinematic viscosity of 200 to 50,000 $mm^2/s$ at 25° C., (3)
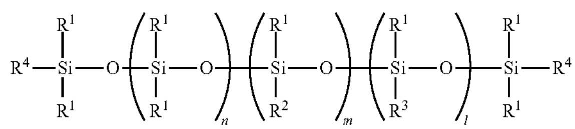

wherein $R^1$ and $R^2$ are as described above; $R^3$ represents the hydrolysable group shown by the formula (1); $R^4$ is the same as $R^1$, or a group selected from the hydrolysable group of formula (1), a hydroxy group and a methoxy group; "n" represents an integer of 5 to 10,000; "m" represents an integer of 1 to 2,000; and "l" represents an integer of 1 to 20.

3. The antifoaming agent according to claim 1, wherein the component (B) is a siloxane resin comprising: a $R^5{}_3SiO_{1/2}$ unit, wherein $R^5$ represents a monovalent hydrocarbon group, a hydrocarbonoxy group, or a hydroxy group, and 10 mol % or more of $R^5$ is a monovalent hydrocarbon group; and an $SiO_2$ unit, wherein $R^5{}_3SiO_{1/2}$ unit/$SiO_2$ unit=0.4 to 2.5.

4. The antifoaming agent according to claim 2, wherein the component (B) is a siloxane resin comprising: a $R^5{}_3SiO_{1/2}$ unit, wherein $R^5$ represents a monovalent hydrocarbon group, a hydrocarbonoxy group, or a hydroxy group, and 10 mol % or more of $R^5$ is a monovalent hydrocarbon group; and an $SiO_2$ unit, wherein $R^5{}_3SiO_{1/2}$ unit/$SiO_2$ unit=0.4 to 2.5.

5. The antifoaming agent according to claim 1, wherein a content of the component (A) is 30 to 90 mass %, a content of the component (B) is 1 to 50 mass %, and a content of the component (C) is 0.5 to 50 mass %.

6. The antifoaming agent according to claim 2, wherein a content of the component (A) is 30 to 90 mass %, a content of the component (B) is 1 to 50 mass %, and a content of the component (C) is 0.5 to 50 mass %.

7. The antifoaming agent according to claim 3, wherein a content of the component (A) is 30 to 90 mass %, a content of the component (B) is 1 to 50 mass %, and a content of the component (C) is 0.5 to 50 mass %.

8. The antifoaming agent according to claim 4, wherein a content of the component (A) is 30 to 90 mass %, a content of the component (B) is 1 to 50 mass %, and a content of the component (C) is 0.5 to 50 mass %.

9. The antifoaming agent according to claim 1, further comprising 0.5 to 20 mass % of (D) an organic oil.

10. The antifoaming agent according to claim 2, further comprising 0.5 to 20 mass % of (D) an organic oil.

11. The antifoaming agent according to claim 3, further comprising 0.5 to 20 mass % of (D) an organic oil.

12. The antifoaming agent according to claim 5, further comprising 0.5 to 20 mass % of (D) an organic oil.

13. A method for manufacturing an antifoaming agent, comprising a step of performing a heat treatment at a temperature of 50° C. or higher and 200° C. or lower after mixing the components (A) to (C) in the antifoaming agent according to claim 1.

14. The method for manufacturing an antifoaming agent according to claim 13, further comprising a step of adding an alkaline substance and mixing before performing the heat treatment.

15. The method for manufacturing an antifoaming agent according to claim 13, further comprising a step of mixing (D) an organic oil with the components (A) to (C).

16. The method for manufacturing an antifoaming agent according to claim 14, further comprising a step of mixing (D) an organic oil with the components (A) to (C).

* * * * *